US011106802B2

(12) United States Patent
Zhao et al.

(10) Patent No.: US 11,106,802 B2
(45) Date of Patent: *Aug. 31, 2021

(54) MODEL TRAINING METHOD AND APPARATUS BASED ON DATA SHARING

(71) Applicant: Advanced New Technologies Co., Ltd., Grand Cayman (KY)

(72) Inventors: Peilin Zhao, Hangzhou (CN); Jun Zhou, Beijing (CN); Xiaolong Li, Seattle, WA (US); Longfei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 194 days.

This patent is subject to a terminal disclaimer.

(21) Appl. No.: 16/053,606

(22) Filed: Aug. 2, 2018

(65) Prior Publication Data

US 2019/0042763 A1 Feb. 7, 2019

(30) Foreign Application Priority Data

Aug. 2, 2017 (CN) .......................... 201710650740.3

(51) Int. Cl.
*G06N 3/063* (2006.01)
*G06N 5/04* (2006.01)
(Continued)

(52) U.S. Cl.
CPC ............. *G06F 21/60* (2013.01); *G06N 3/063* (2013.01); *G06N 5/043* (2013.01); *G06N 20/00* (2019.01);
(Continued)

(58) Field of Classification Search
CPC .............................. G06N 3/086; G06N 5/043
See application file for complete search history.

(56) References Cited

U.S. PATENT DOCUMENTS

| 7,630,986 B1 | 12/2009 | Herz et al. |
| 8,176,563 B2 | 5/2012 | Redlich et al. |
| (Continued) | | |

FOREIGN PATENT DOCUMENTS

| CN | 1975720 | 6/2007 |
| CN | 101651677 | 2/2010 |
| (Continued) | | |

OTHER PUBLICATIONS

Xing et al. (Petuum: A New Platform for Distributed Machine Learning on Big Data, Jun. 2015, pp. 49-67) (Year: 2015).*
(Continued)

*Primary Examiner* — George Giroux
(74) *Attorney, Agent, or Firm* — Fish & Richardson P.C.

(57) ABSTRACT

Techniques for data sharing between a data miner and a data provider are provided. A set of public parameters is downloaded from the data miner. The public parameters are data miner parameters associated with a feature set of training sample data. A set of private parameters in the data provider can be replaced with the set of public parameters. The private parameters are data provider parameters associated with the feature set of training sample data. The private parameters are updated to provide a set of update results. The private parameters are updated based on a model parameter update algorithm associated with the data provider. The update results is uploaded to the data miner.

19 Claims, 9 Drawing Sheets

(51) Int. Cl.
  *G06N 20/00* (2019.01)
  *G06F 21/60* (2013.01)
  *G06Q 10/10* (2012.01)
  *G06Q 10/06* (2012.01)
(52) U.S. Cl.
  CPC ......... *G06Q 10/0635* (2013.01); *G06Q 10/10* (2013.01)

(56) References Cited

U.S. PATENT DOCUMENTS

| 10,607,226 | B2* | 3/2020 | Patel ................... G06Q 20/322 |
| 2009/0319457 | A1 | 12/2009 | Cheng et al. |
| 2011/0173116 | A1 | 7/2011 | Yan et al. |
| 2012/0246176 | A1 | 9/2012 | Takamatsu |
| 2014/0074760 | A1 | 3/2014 | Boldyrev et al. |
| 2014/0088989 | A1 | 3/2014 | Krishnapuram et al. |
| 2014/0143251 | A1 | 5/2014 | Wang et al. |
| 2014/0201126 | A1* | 7/2014 | Zadeh ................... A61B 5/165 706/52 |
| 2016/0078361 | A1 | 3/2016 | Brueckner |
| 2017/0109322 | A1 | 4/2017 | McMahan |
| 2017/0148027 | A1 | 5/2017 | Yu et al. |
| 2017/0169078 | A1 | 6/2017 | Fradkin et al. |
| 2017/0236072 | A1 | 8/2017 | Rendle et al. |
| 2018/0285759 | A1 | 10/2018 | Wood |
| 2020/0125737 | A1 | 8/2020 | Zhao et al. |

FOREIGN PATENT DOCUMENTS

| CN | 104008203 | 8/2014 |
| CN | 104301413 | 1/2015 |
| CN | 102765643 | 6/2015 |
| CN | 104699777 | 6/2015 |
| CN | 105046366 | 11/2015 |
| CN | 105069286 | 11/2015 |
| CN | 105426857 | 3/2016 |
| TW | 201537366 | 10/2015 |

OTHER PUBLICATIONS

Li et al. (Communication Efficient Distributed Machine Learning with the Parameter Server, Dec. 2014, pp. 1-9) (Year: 2014).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report in Patentability in International Appln. PCT/US2018/044404, dated Nov. 6, 2019, 12 pages.
Xiaofeng et al, "Big Data Privacy Management," Journal of Computer Research and Development, 2015, 17 pages (with English abstract).
Second Written Opinion in International Application No. PCT/US2018/044404, dated Jun. 28, 2019, 7 pages.
International Search Report and Written Opinion in International Application No. PCT/US2018/044404, dated Nov. 26, 2018, 13 pages.
Wang, "Communication Filters for Distributed Optimization with the Parameter Server", Master Thesis, May 2015, 46 pages.
Shokri et al, "Privacy-Preserving Deep Learning," Proceedings of the 22nd ACM SIGSAC Conference on Computer and Communications, dated Oct. 2015, 12 pages.

* cited by examiner

MODEL TRAINING METHOD AND APPARATUS BASED ON DATA SHARING

CROSS REFERENCE TO RELATED APPLICATIONS

This application claims priority to Chinese Patent Application No. 201710650740.3, filed on Aug. 2, 2017, which is hereby incorporated by reference in its entirety.

TECHNICAL FIELD

Implementations of the present application relate to the field of data mining technologies, and in particular, to a model training method and apparatus based on data sharing.

BACKGROUND

In the big data era, various types of useful information can be obtained by the mining of massive data. Therefore, data is extremely important. Different institutions have their own data, but a data mining effect of any institution is subject to the data amount and the data type of the institution. A direct solution to this problem is as follows: A plurality of mechanisms cooperate with each other to share data so as to achieve a better data mining effect, thereby achieving a win-win scenario.

However, for a data owner, data is an asset of great value. For purposes such as privacy protection, the data owner is usually unwilling to provide data. In this case, it is difficult to perform "data sharing". Therefore, achieving data sharing while ensuring data security has become a top concern in the industry.

SUMMARY

To resolve the previous technical problem, implementations of the present application provide a model training method and apparatus based on data sharing. Technical solutions are described below.

According to a first aspect of the implementations of the present application, a model training method based on data sharing is provided, where a data miner and at least one of the data providers separately maintain model parameters for a feature set of training sample data. The data miner maintains a public parameter set $W^{global}$, and each data provider u maintains a private parameter set $W^u$. The method includes performing iterative training by performing the following steps, until a model training requirement is satisfied: downloading a public parameter from the data miner by the data provider u, and replacing a private parameter set $W^u$ that is locally maintained by using a downloading result; updating a private parameter set $W^u$ that is obtained after the replacement by using local data and a model parameter update algorithm; and uploading an update result to the data miner so that the data miner updates the public parameter set $W^{global}$ by using the update result uploaded by the data provider.

According to a second aspect of the implementations of the present application, a model training apparatus based on data sharing is provided, where a data miner and at least one of the data provider separately maintain model parameters for a feature set of training sample data. The data miner maintains a public parameter set $W^{global}$, and each data provider u maintains a private parameter set $W^u$. The apparatus includes the following modules configured to perform iterative training: a public parameter downloading module, configured for the data provider u to download a public parameter from the data miner, and replace a private parameter set $W^u$ that is locally maintained by using a downloading result; a private parameter update module, configured to update a private parameter set $W^u$ that is obtained after the replacement by using local data and a model parameter update algorithm; and an update result uploading module, configured to upload an update result to the data miner so that the data miner updates the public parameter set $W^{global}$ by using the update result uploaded by the data provider.

According to a third aspect of the implementations of the present application, a model training system based on data sharing is provided, where the system includes a data miner apparatus and at least one of the data provider apparatus, where the data miner apparatus and the data provider apparatus separately maintain model parameters for a feature set of training sample data. The data miner apparatus maintains a public parameter set $W^{global}$, and each data provider u apparatus maintains a private parameter set $W^u$. The data provider apparatus includes the following modules configured to perform iterative training: a public parameter downloading module, configured for the data provider u apparatus to download a public parameter from the data miner apparatus, and replace a private parameter set $W^u$ that is locally maintained by using a downloading result; a private parameter update module, configured to update a private parameter set $W^u$ that is obtained after the replacement by using local data and a model parameter update algorithm; and an update result uploading module, configured to upload an update result to the data miner apparatus; and the data miner apparatus is configured to update the public parameter set $W^{global}$ by using the update result uploaded by the data provider apparatus.

In the technical solutions provided in the implementations of the present application, a data miner can perform joint training based on data provided by a plurality of data providers so as to obtain a better training effect. In addition, during the model training, a specific iterative parameter update operation is completed by a data provider. Therefore, the data provider needs to upload only a result of each parameter update to the data miner instead of providing specific data to the data miner, thereby effectively ensuring data security of the shared-data provider.

It should be understood that the previous general description and the following detailed description are merely exemplary and illustrative and cannot limit the implementations of the present application.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings.

DESCRIPTION OF IMPLEMENTATIONS

To make a person skilled in the art better understand the technical solutions, the following describes in detail the technical solutions in the implementations of the present application with reference to the accompanying drawings. Apparently, the described implementations are merely some rather than all of the implementations of the present application. Other implementations obtained by a person of ordinary skill in the art based on the implementations of the present application shall fall within the protection scope of the implementations of the present application.

Figure 1:
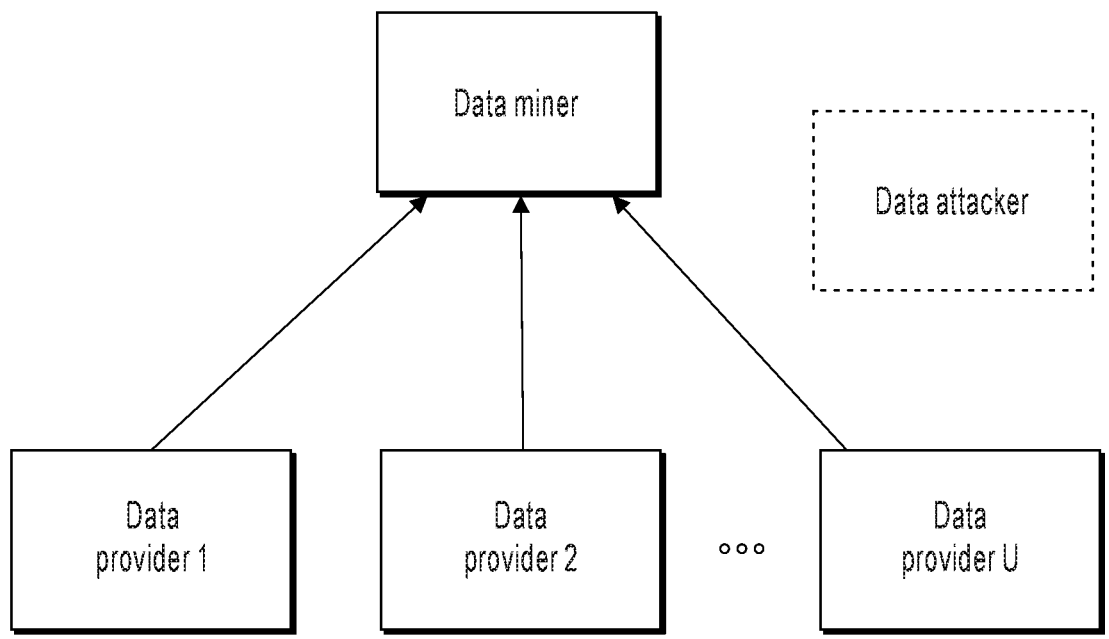
FIG. 1 is a schematic diagram illustrating an example data sharing cooperation model.

As shown in FIG. 1, a "data sharing" cooperation mode can include several roles, such as a data provider, a data miner, and a data attacker. A plurality of data providers jointly provide data to a data miner to perform data sharing and mining. However, to protect data privacy, the data providers may be unwilling to provide intact data to the data miner. In addition, the data providers further need to prevent data attackers from stealing the data. Generally speaking, for any data providers, data miners and other data providers can be potential attackers.

Therefore, a basic requirement on secure data sharing is as follows: A data miner can perform mining by using data of a data provider while ensuring data privacy of the data provider.

To satisfy the above-identified requirement, the implementations of the present application provide a data sharing solution. This solution is used to train a data model based on massive data samples. The data samples are provided by a plurality of data providers. Because multiple data providers can provide a larger number of data samples, it is expected that a better data model can be obtained through training after shared data of the data providers are consolidated.

Figure 2:
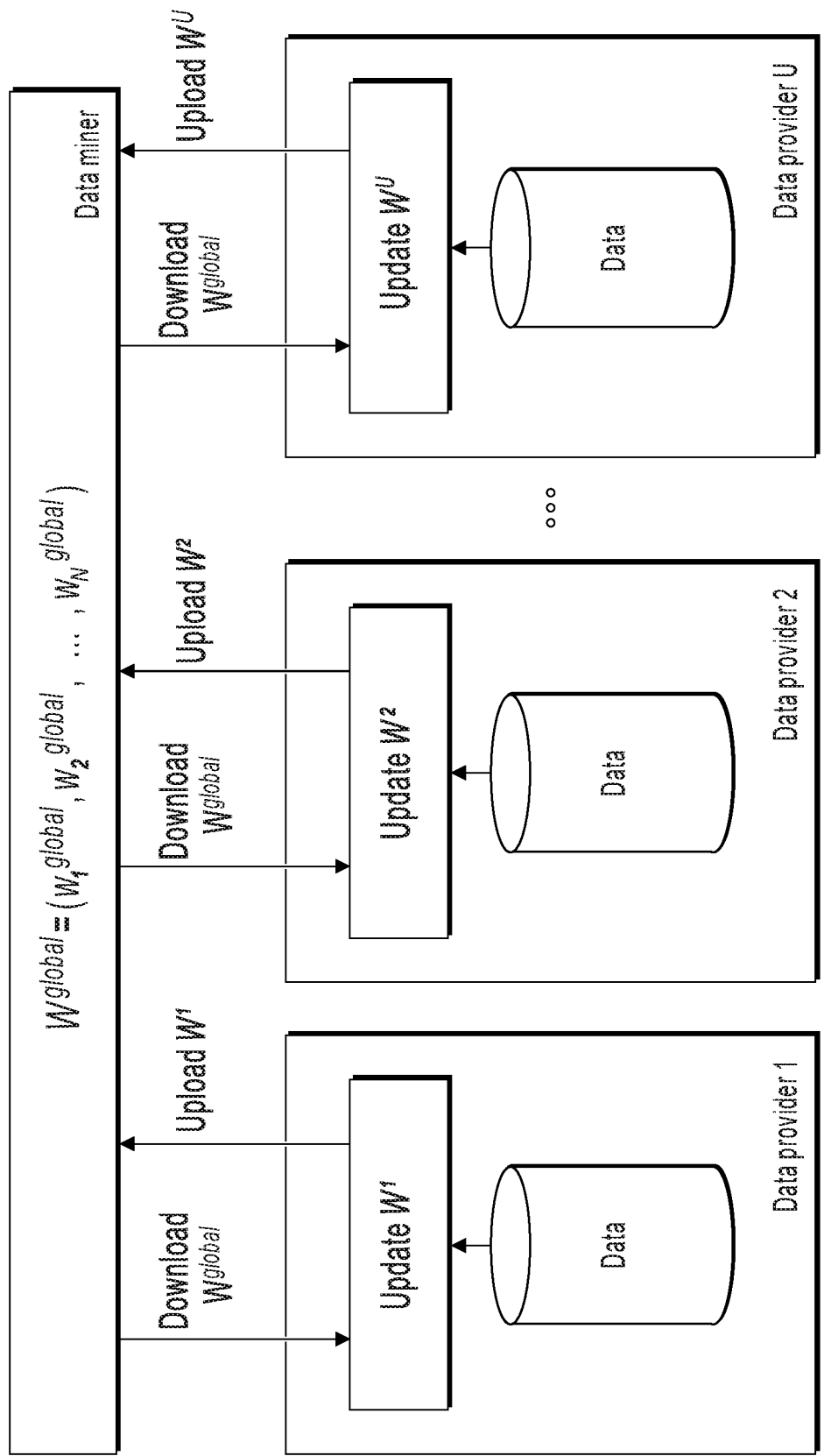
FIG. 2 is a schematic architectural diagram illustrating an example model training system according to the present application.

An architecture of a data sharing system provided in an implementation of the present application is shown in FIG. 2. Assume that U data providers 1, 2, . . . , U jointly provide data to a data miner so that the data miner obtains a global model through training. A high-level data sharing working principle can be described as follows:

Each data provider u (u=1, 2, . . . , U) can provide data including a feature set $X=(x_1, x_2, \ldots, x_N)$. The global model is obtained through training based on the feature set $X=(x_1, x_2, \ldots, x_N)$, and a corresponding model parameter set is $W=(w_1, w_2, \ldots, w_N)$.

To enhance data security, instead of uploading private data to the data miner for training, each data provider u performs local training and uploads a parameter obtained through training to the data miner. The data miner combines parameters uploaded by the data providers u to obtain the global parameter model.

In the above-described solution, the data miner and each of the U data providers need to maintain a model parameter set for the feature set $X=(x_1, x_2, \ldots, x_N)$. For ease of description, the present application provides the following definition:

A parameter set maintained by the data miner is referred to as a public parameter set, and is represented as:

$$W^{global}=(w_1^{global}, w_2^{global}, \ldots, w_N^{global}); \text{ and}$$

a parameter set maintained by any data provider u is referred to as a private parameter set of u, and is represented as:

$$W^u=(w_1^u, w_2^u, \ldots, w_N^u), \text{ where } u=1,2,\ldots,U.$$

In actual application, a constant parameter $w_0$ can be included in the parameter set expressions. In this case, number of parameters in the parameter set is N+1 and is inconsistent with number N of features. For ease of consistent representation, $w_0$ can be understood as a parameter that corresponds to a feature $x_0$, and a feature value of the feature $x_0$ is always equal to 1. As such, regardless of whether there is a constant parameter, the number of parameters is consistent with the number of features. Therefore, it should be understood that the parameter set expressions and the feature set expression in the present application cover both cases: when "there is a constant parameter" and when "there is no constant parameter".

Data model training can be a process of searching for an optimum model parameter value through iterations. Model parameters are updated after each iteration, and the training continues until updated model parameters satisfy a training requirement. The solution in this implementation of the present application is described below based on one complete iteration.

Figure 3:
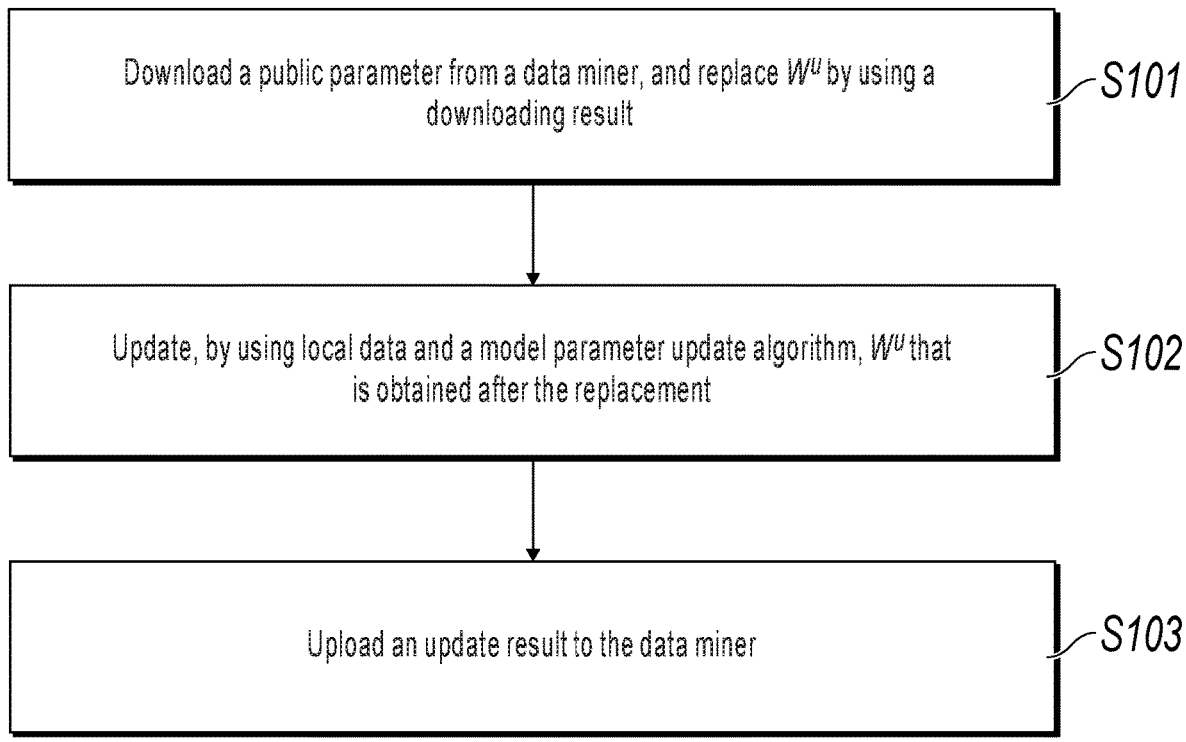
FIG. 3 is a schematic flowchart illustrating a model training method based on data sharing according to an implementation of the present application.

The data miner and the U data providers separately initialize model parameters, then store the initialized parameter values. As shown in FIG. 3, any data provider u performs the following operations during one iteration.

S101. Download a public parameter from a data miner, and replace $W^u$ by using a downloading result.

Assume that a number N of features are used during model training, a corresponding parameter set is $W=(w_1, w_2, \ldots, w_N)$, and a public parameter set maintained by the data miner is:

$$W^{global}=(w_1^{global}, w_2^{global}, \ldots, w_N^{global}).$$

The data provider u downloads $W^{global}$ from the data miner, and replaces, by using the downloading result, the maintained private parameter set $W^u=(w_1^u, w_2^u, \ldots, w_N^u)$.

S102. Update, by using local data and a model parameter update algorithm, $W^u$ that is obtained after the replacement.

During model training, a basic form of an iterative parameter update is as follows:

$$W \leftarrow W - \alpha * \Delta * X.$$

During model training, model parameters are constantly updated through iteration so that a model fitting effect of a training sample set satisfies a training requirement (for example, a deviation value is small enough). The parameter update equation is briefly described below. For a specific derivation process of the parameter update equation, references can be made to the existing technology.

In the update equation provided above, "W" on the right side of the arrow represents a parameter value existing before each update, and "W" on the left side of the arrow represents a parameter value obtained after each update. It can be seen that a change value of each update is a product of α, Δ and X.

α represents a learning rate (also referred to as a step), which determines a parameter update degree of each iteration. If the learning rate is slow, a training requirement may be slowly satisfied. If the learning rate is fast, the "overshoot the minimum" phenomenon may occur, that is, model fitting cannot be approached with the update process. For how an appropriate learning rate can be selected, references can be made to the existing technology. In this implementation of the present application, α is considered as a predetermined value.

X represents a feature value of a data sample. Based on different selected update equations, X can alternatively represent different forms of the feature value. The implementation of the present application is further described by using the following examples.

Δ is a predilection deviation value, which is defined as a difference between a predicted value and a label value of a model. Assume that the model is $y=h(X)=h(w_1x_1+w_2x_2+\ldots w_Nx_N)$, Δ is $h(X)-y$ or $y-h(X)$.

For given training sample data i, if a feature value set of i is $X_i=(x_{i1}, x_{i2}, \ldots, x_{iN})$, and a label value of i is $y_i$, a corresponding deviation value is $\Delta_i=h(X_i)-y_i$ or $\Delta_i=y_i-j(X_i)$.

In actual application, based on different selected model parameter update algorithms, there are different forms of update equations.

If parameter update is performed by using the gradient descent method, all training samples participate in an update operation during each iteration, a parameter update equation can be expressed as:

$$W \leftarrow W - \alpha\Sigma_i\Delta_iX_i, \text{ that is:}$$

$$w_1 \leftarrow w_1 - \alpha\Sigma_i\Delta_ix_{i1}$$

$$w_2 \leftarrow w_2 - \alpha\Sigma_i\Delta_ix_{i2}$$

. . . .

If parameter update is performed by using the stochastic gradient descent method, one training sample is randomly selected to participate in an update operation during each iteration, a parameter update equation can be expressed as:

$$W \leftarrow W - \alpha\Delta_iX_i, \text{ where } i \text{ is a random value, that is:}$$

$$w_1 \leftarrow w_1 - \alpha\Delta_ix_{i1}$$

$$w_2 \leftarrow w_2 - \alpha\Delta_ix_{i2}$$

. . . .

The above described update algorithms are merely examples, and other available update algorithms are not listed one by one in the present application. In sum, the data provider u can obtain an updated private parameter value set $W^u=(w_1^u, w_2^u, \ldots, w_N^u)$ by using the local data and the model parameter update algorithm.

S103. Upload an update result to the data miner.

The data provider u uploads the updated $W^u=(w_1^u, w_2^u, \ldots, w_N^u)$ to the data miner, so that the data miner can update $W^{global}$ by using the update result after receiving the update result.

One iterative model parameter update process performed by a single data provider is described above. From a high-level perspective of the system, each data provider performs the iterative update operation for a plurality of times, until a model training requirement is satisfied.

The conditions for terminating the model training can be as follows: A difference between the public parameters in the two adjacent iterations is small (less than a predetermined threshold), a number of iterations (which can be a number of global iterations or a number of internal iterations of a single data provider) reaches a predetermined value, or the verification is performed by using an additional verification set, etc. A terminating condition for the model training is not limited in the present application.

It can be seen that in the above-described solution, a data miner can continuously update a public parameter set $W^{global}$ by using data of a plurality of the data providers. A public parameter set $W^{global}$ that is downloaded each time by a single data provider is a result obtained after the plurality of the data providers jointly participate in an update, and then a parameter can be updated again by using local data. Therefore, repeating the above iterative operation is equivalent to the data miner using data of the plurality of the data providers for training as a whole. However, during the training, a data provider needs to upload only the result of each updated parameter to the data miner, instead of providing specific data to the data miner, thereby effectively ensuring data security of the shared-data provider.

In another implementation provided in the present application, a public parameter downloading process and a private parameter uploading process during model training can be optimized to further enhance data security. Several descriptions of the examples are provide below:

1. Downloading public parameters:

A number N of parameters are included in a public parameter set $W^{global}=(w_1^{global}, w_2^{global}, \ldots, w_N^{global})$, and a data provider can download some parameters from a data miner each time.

If $W^{global \rightarrow u}$ represents a public parameter subset that is downloaded by the data provider u from the data miner, $W^{global \rightarrow u}$ is a proper subset of $W^{global}$, that is, a number $N_{download}^u$ of parameters in $W^{global \rightarrow u}$ is less than N.

From a high-level perspective, data providers u can correspond to a same number $N_{download}^u$ or different numbers $N_{download}^u$, and an intersection set between parameter subsets $W^{global \rightarrow u}$ that correspond to the data providers u can be empty or non-empty.

For example, if a public parameter set includes four features in total: $w_1$, $w_2$, $w_3$, and $w_4$, and there are two data providers in total, a parameter downloading scheme can be as follows:

$W^{global \rightarrow 1}=(w_1^{global}, w_2^{global})$ and $W^{global \rightarrow 2}=(w_3^{global}, w_4^{global})$, that is, a data provider 1 downloads parameters $w_1$ and $w_2$, and a data provider 2 downloads parameters $w_3$ and $w_4$ (in this case, there is no intersection set between the two parameter subsets $W^{global \rightarrow u}$); or $W^{global \rightarrow 1}=(w_1^{global}, w_2^{global}, w_3^{global})$ and $W^{global \rightarrow 2}=(w_2^{global}, w_3^{global}, w_4^{global})$, that is, a data provider 1 downloads parameters $w_1$, $w_2$, and $w_3$, and a data provider 2 downloads parameters $w_2$, $w_3$, and $w_4$ (in this case, there is an intersection set between the two parameter subsets $W^{global \rightarrow u}$).

In addition, the data provider u can download a public parameter subset for a different feature during each iteration from the data miner.

For example, the data provider u downloads parameters $w_1^{global}$ and $w_2^{global}$ during the first iteration, downloads parameters $w_2^{global}$ and $w_3^{global}$ during the second iteration, and downloads parameters $w_3^{global}$ and $w_4^{global}$ during the third iteration.

In actual application, the data miner can perform centralized control to allocate public parameter subsets to data providers, so the amount of information obtained by the data providers are basically balanced. Alternatively, the data miner can use a round robin allocation method, so all the data providers have the opportunity to train parameters by using their own data to better utilize data of the data providers, thereby achieving a better training effect. In addition, the data miner can allocate parameters that satisfy a convergence condition to a smaller degree to a data miner for downloading, so as to accelerate convergence of these parameters.

2. Uploading private parameters:

When uploading a parameter update result, a data provider u can upload updated parameter values ($w_1^u$, $w_2^u$, ..., and $w_N^u$) to the data miner, or can upload, parameter change values ($\Delta w_1^u$, $\Delta w_2^u$, ..., and $\Delta w_N^u$) generated during this update to the data miner. If the former method is used, the data miner can update public parameters by replacing corresponding parameters. If the latter method is used, the data miner can add the parameter change values to the original public parameter values to obtain the updated public parameter values, that is:

$$w_j^{global} \leftarrow w_j^{global} + \Delta w_j^u, \text{ where } j=1,2,\ldots N.$$

In addition, similar to the downloading process, for the private parameter set $W^u = (w_1^u, w_2^u, \ldots, w_N^u)$ maintained by the data provider u, after each parameter update, only some parameters can be uploaded to the data miner.

If $W^{u \to global}$ represents a public parameter that is uploaded by the data provider u to the data miner, $W^{u \to global}$ is a proper subset of $W^u$, that is, a number $N_{upload}^u$ of parameters in $W^{u \to global}$ is less than N.

Data providers u can correspond to a same number $N_{upload}^u$ or different numbers $N_{upload}^u$. In actual application, the data miner can centrally specify parameters that need to be uploaded by the data providers, or the data providers control parameters that need to be uploaded.

For example, after completing a parameter update, the data provider u can sort change values (absolute values of $\Delta w_1^u$, $\Delta w_2^u$, ... and $\Delta w_N^u$) that are of the parameters in $W^u$ and that are generated during this update, and then select one or more parameters that correspond to one or more larger change values, based on a sorting result, to form $W^{u \to global}$. Specific schemes can include the following:

selecting a predetermined number $N_{upload}^u$ of parameters from a parameter, whose parameter change value is the largest, to form $W^{u \to global}$;

selecting only parameters, whose change values are not less than a predetermined value, to form $W^{u \to global}$;

randomly selecting a predetermined number $N_{upload}^u$ of parameters from parameters, whose change values are not less than a predetermined value, to form $W^{u \to global}$;

. . . .

The previously described private parameter subset determining schemes are merely examples, and other available schemes are not listed one by one in the present application.

After determining $W^{u \to global}$, the data provider u can upload a corresponding parameter value $w_j^u$ or can upload a corresponding parameter change value $\Delta w_j^u$.

To enhance data security, the data provider u can further process the update result before uploading the parameter update result. For example, the data provider u can truncate an update result based on a predetermined value range $[-\gamma, \gamma]$, and then upload the update result to the data miner. Alternatively (or in addition), the data provider u can add certain noises to the update result, and then upload the update result to the data miner. The update result here can be the parameter value $w_j^u$ or the parameter change value $\Delta w_j^u$.

Figure 4:
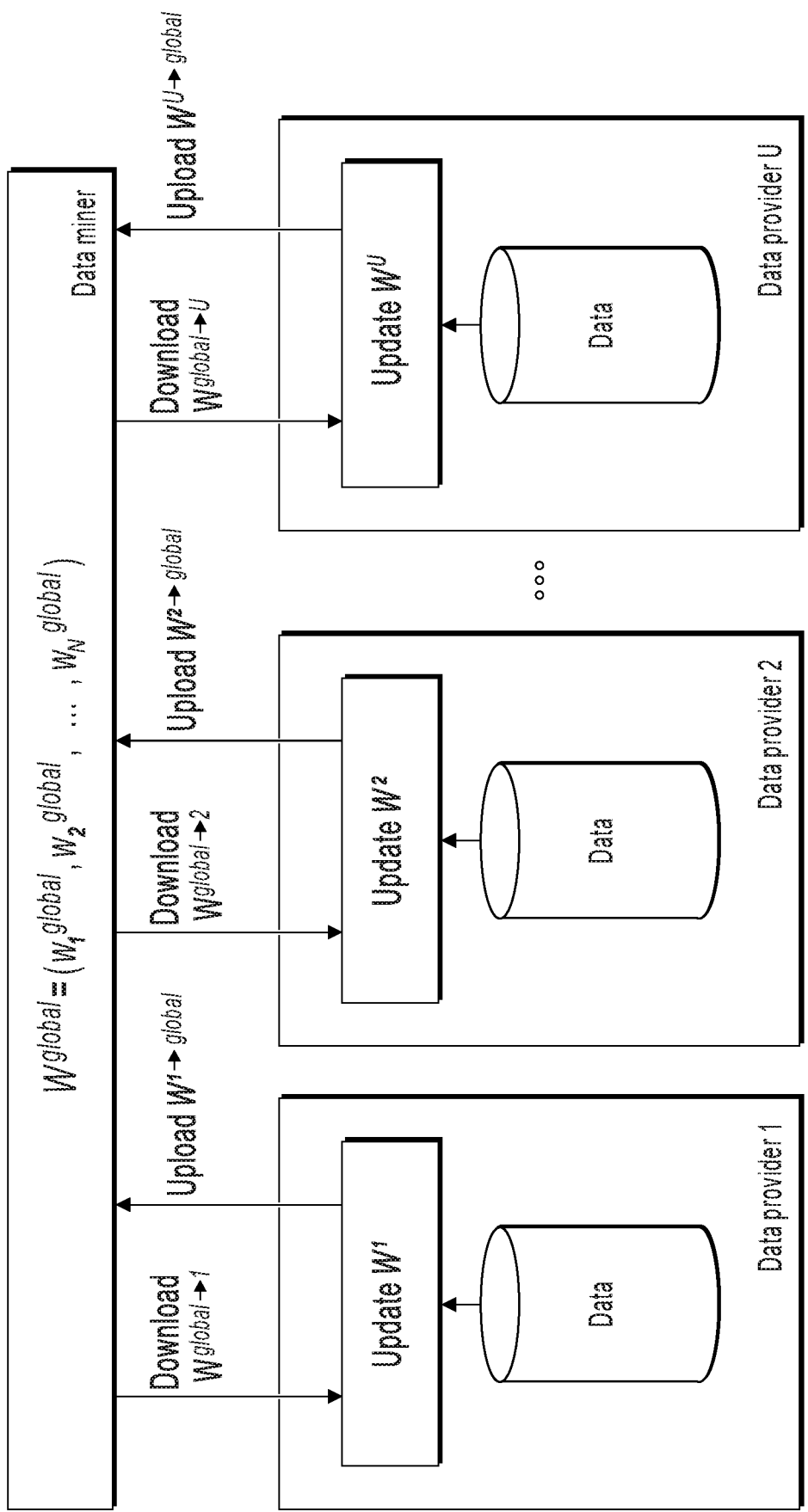
FIG. 4 is another schematic architectural diagram illustrating a model training system according to the present application.

FIG. 4 shows an architecture of a data sharing system based on an optimized public parameter downloading method and an optimized private parameter uploading method described herein. In the optimized parameter downloading and uploading schemes, incomplete data is transmitted between a data miner and a data provider each time. Even if the data is intercepted by a potential data attacker, effective loss control can be achieved.

It should be noted that the previously described "public parameter downloading" and "private parameter uploading" schemes can be two independent optimization schemes. The two schemes can be implemented simultaneously or separately. In other words, it is possible that there is no association between $W^{global \to u}$ and $W^{u \to global}$. In addition, in some cases, the data providers are allowed to separately use different "public parameter downloading" and "private parameter uploading" schemes. Therefore, what is shown in FIG. 4 should not be understood as a limitation to the solutions in the present application.

It can be understood that the solutions provided in the present application can be used when only one data provider provides data to a data miner (U=1). This situation is applicable to an application scenario in which a certain data provider entrusts a data miner to perform data mining but is unwilling to reveal data details to the data miner.

In addition, when a plurality of data providers, some with no data privacy protection requirement, provide data to a data miner, the data providers with no data privacy protection requirement can directly provide data to the data miner or directly send a parameter update result to the data miner. A processing method of the data providers that have no data privacy protection requirement is not limited in the present application. Certainly, from a perspective of data privacy, "no data privacy protection requirement" is usually not absolute. For example, "no data privacy protection requirement" may mean that the data miner has no internal data privacy protection requirement. If there is a deep cooperation relationship between a data provider and the data miner, or some data of the data miner can be used to participate in global model training it can be considered that the data miner is one of data providers. For the data miner, such data can be directly used for model training.

The following describes the solutions in the implementations of the present application based on an example.

Assume that a high-level training requirement is establishing, based on asset data of the user provided by two banking institutions, a model for predicting whether a user is capable of repaying a heavy loan on schedule.

Both a bank 1 and a bank 2 can provide data that has features $x_1$, $x_2$, $x_3$, and $x_4$ and use the data as a training sample.

A logistic regression model is used for overall modeling, and a function is as follows:

$$y = \frac{1}{1+e^{-z}},$$

where $$z = (w_1 x_1 + w_2 x_2 + w_3 x_3 + w_4 x_4)$$

Figure 5:
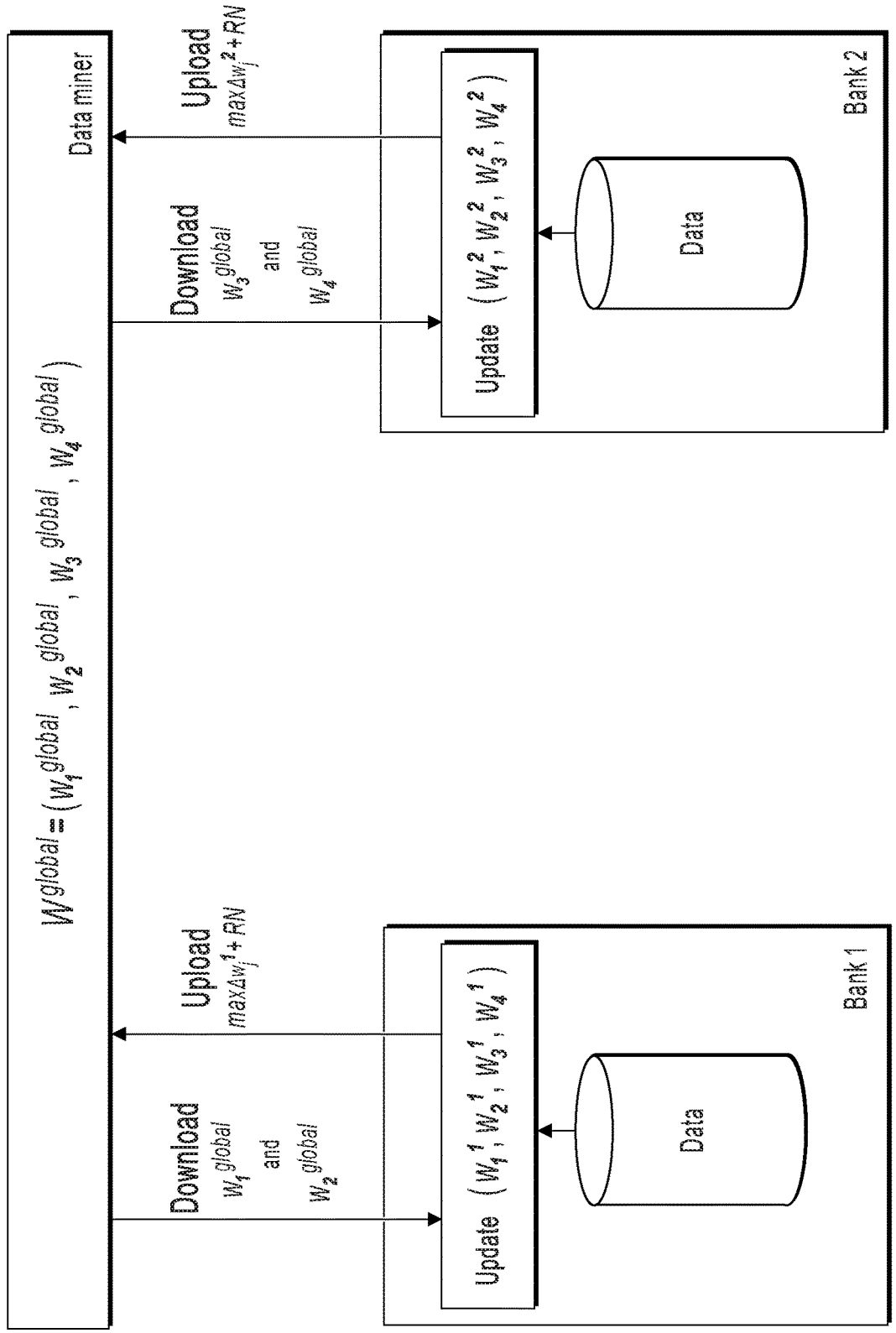
FIG. 5 is a schematic architectural diagram illustrating a model training system according to an implementation of the present application.

A high-level system configuration is shown in FIG. 5:

A data miner maintains a public parameter set ($w_1^{global}$, $w_2^{global}$, $w_3^{global}$, $w_4^{global}$); a processing end configured on a bank 1 side maintains a private parameter set ($w_1^1$, $w_2^1$, $w_3^1$, $w_4^1$); and a processing end configured on a bank 2 side maintains a private parameter set ($w_1^2$, $w_2^2$, $w_3^2$, $w_4^2$).

Before training, the data miner, the processing end on the bank 1 side, and the processing end on the bank 2 side separately initialize parameters maintained by them. A same learning rate α is configured for both the bank 1 and the bank 2.

A parameter downloading scheme is centrally allocated by the data miner. The parameter downloading scheme can be as follows: During each iteration, the bank 1 downloads $w_1^{global}$ and $w_2^{global}$ and replaces the private parameter set; and during each iteration, the bank 2 downloads $w_3^{global}$ and $w_4^{global}$ and replaces the private parameter set.

Local banking data is separately retrieved from the processing end on the bank 1 side and the processing end on the bank 2 side, and the private parameter sets are updated by using the stochastic gradient descent method.

After the update is complete, the processing end on the bank 1 side and the processing end on the bank 2 side separately determine whose parameter change values are the largest during this parameter update, and upload a result to the data miner after random noises are added to the corresponding change values. The processing end on the bank 1 side uploads $\max\Delta w_j^1 + RN$; and the processing end on the bank 2 side uploads $\max\Delta w_j^2 + RN$, where j=1, 2, 3, 4, and RN represents random noises.

After the data miner updates the public parameter set based on the parameters uploaded by the bank 1 and the bank 2, this iteration is completed. When differences between the values of $w_1^{global}$, $w_2^{global}$, $w_3^{global}$, and $w_4^{global}$ generated during two adjacent iterations are less than a predetermined value, it can be considered that the model parameters are converged, and the training terminates.

It can be seen that during the above-described training, the data providers upload only parameter change values of each iteration to the data miner, thereby effectively preventing loss of the original data. In addition, the data providers upload only the largest parameter change values each time, and noises are added to the change values. Therefore, even if the change values are intercepted by an attacker during network transmission, it is very difficult for the attacker to obtain useful information from the change values.

Figure 6:
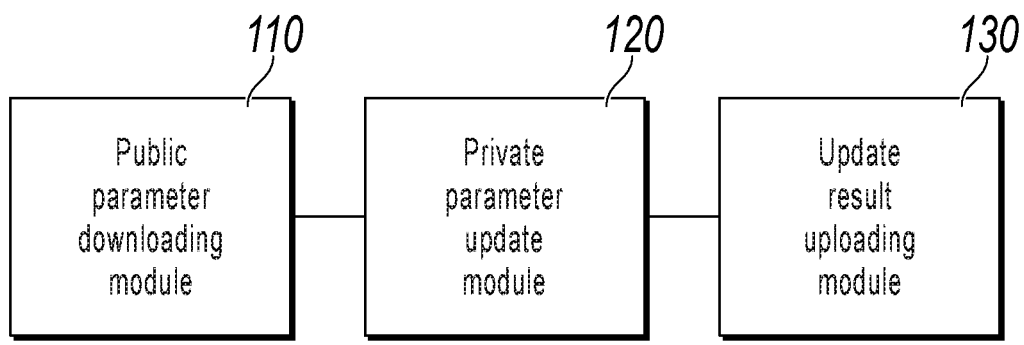
FIG. 6 is a schematic structural diagram illustrating a model training apparatus based on data sharing according to an implementation of the present application.

Corresponding to the previous method implementations, an implementation of the present application further provides a model training apparatus based on data sharing. The apparatus is used by a data provider. Referring to FIG. 6, the apparatus can include the following modules configured to perform iterative training: a public parameter downloading module 110, configured for the data provider u to download a public parameter from a data miner and replace $W^u$ by using a downloading result; a private parameter update module 120, configured to update $W^u$ that is obtained after the replacement by using local data and a model parameter update algorithm; and an update result uploading module 130, configured to upload an update result to the data miner so that the data miner updates $W^{global}$ by using the update result uploaded by the data provider.

In a specific implementation provided in the present application, the public parameter downloading module 110 can be configured to download a public parameter subset $W^{global \to u}$ from the data miner, where a number $N_{download}^u$ of parameters in $W^{global \to u}$ is less than a number N of parameters in $W^{global}$.

In a specific implementation provided in the present application, public parameter downloading modules of different data providers can be configured to download public parameter subsets for different features from the data miner.

In a specific implementation provided in the present application, the public parameter downloading module 110 can be configured to the following: download a public parameter subset for a different feature during each iteration from the data miner.

In a specific implementation provided in the present application, the update result uploading module 130 can be configured to the following: upload an updated parameter value to the data miner; or upload a parameter change value generated during updating to the data miner.

In a specific implementation provided in the present application, the update result uploading module 130 can be configured to the following: determine a private parameter subset $W^{u \to global}$, and upload a parameter update result that corresponds to $W^{u \to global}$ to the data miner, where a number $N_{upload}^u$ of parameters in $W^{u \to global}$ is less than a number N of parameters in $W^u$.

In a specific implementation provided in the present application, the update result uploading module 130 can be configured to the following: sort the change values generated during updating, which are parameters in $W^u$, and select the parameters that correspond to one or more change values with the largest values to form $W^{u \to global}$.

In a specific implementation provided in the present application, the update result uploading module 130 can be configured to the following: upload a result that is obtained to the data miner after the update result is truncated based on a predetermined value range; or upload a result that is obtained to the data miner after noise addition processing is performed on the update result.

Figure 7:
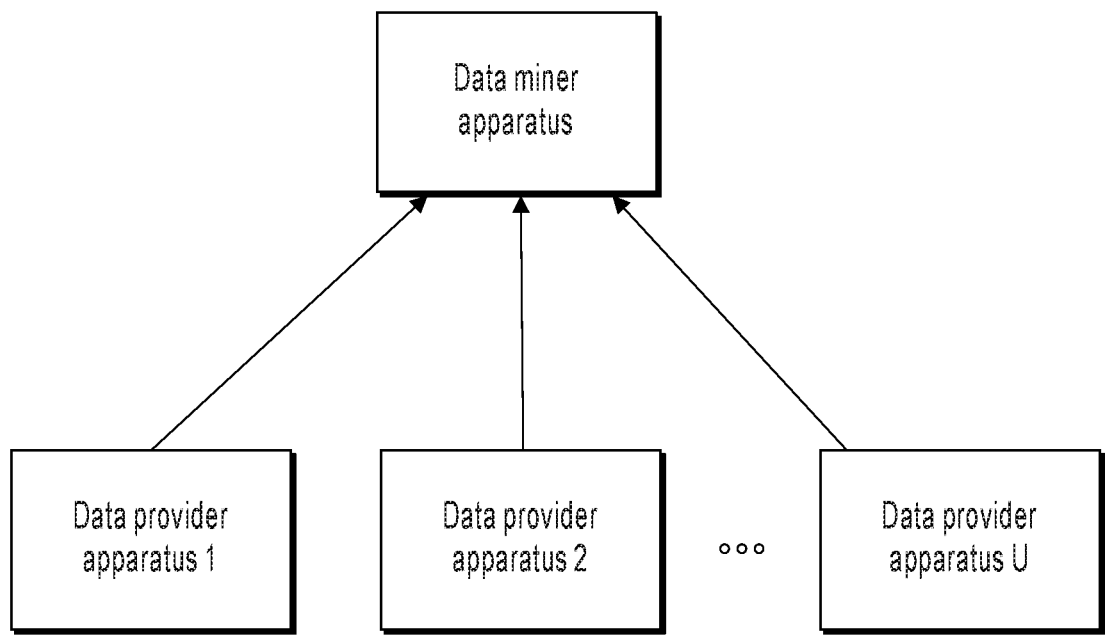
FIG. 7 is a schematic structural diagram illustrating a configuration of a model training system based on data sharing according to the present application.

Referring to FIG. 7, an implementation of the present application further provides a model training system based on data sharing. The system includes a data miner apparatus and U data provider apparatus.

The data miner apparatus and the data provider apparatus separately maintain model parameters for a feature set of training sample data.

The data miner apparatus maintains a public parameter set $W^{global}$, and the data provider u apparatus maintains a private parameter set $W^u$.

The data provider apparatus includes the following modules configured to perform iterative training: a public parameter downloading module, configured for the data provider u apparatus to download a public parameter from the data miner apparatus, and replace $W^u$ by using a downloading result; a private parameter update module, configured to update $W^u$ that is obtained after the replacement by using local data and a model parameter update algorithm; and an update result uploading module, configured to upload an update result to the data miner apparatus.

The data miner apparatus is configured to update $W^{global}$ by using the update result uploaded by the data provider apparatus.

An implementation of the present application further provides a computer device. The computer device includes at least a memory, a processor, and a computer program that is stored in the memory and can run on the processor. When executing the program, the processor performs the previous model training method.

Figure 8:
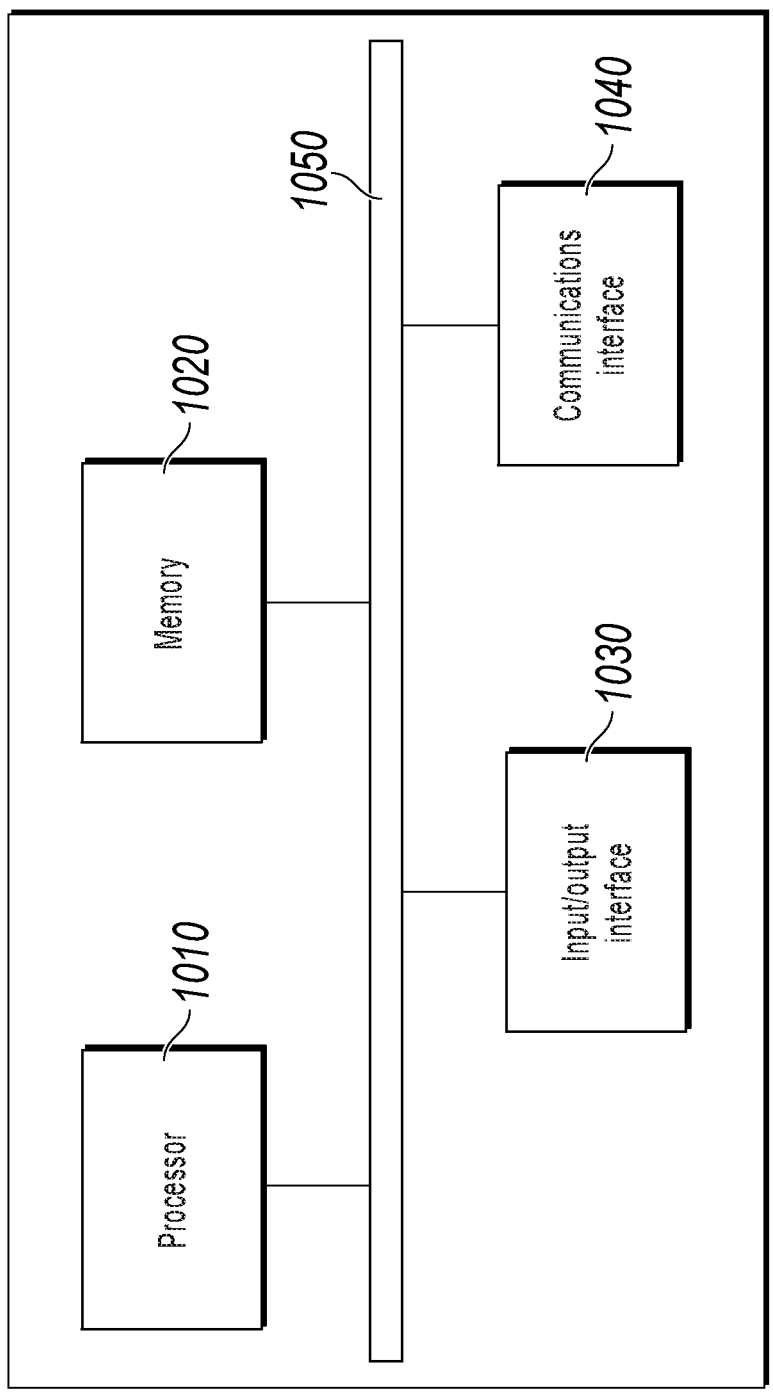
FIG. 8 is a schematic structural diagram illustrating a computer device according to the present application.

FIG. 8 is a more detailed schematic diagram illustrating a hardware structure of a computing device according to an implementation of the present application. The device can include a processor 1010, a memory 1020, an input/output interface 1030, a communications interface 1040, and a bus 1050. The processor 1010, the memory 1020, the input/ output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and the processor is configured to execute a related program so as to implement the technical solutions provided in the implementations of the present application.

The memory 1020 can be implemented by using a read-only memory (ROM), a random access memory (RAM), a static storage device, a dynamic storage device, etc. The memory 1020 can store an operating system and other application programs. When the technical solutions provided in the implementations of the present application are implemented by using software or firmware, related program code is stored in the memory 1020, and the program code is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input device can include a keyboard, a mouse cursor, a touchscreen, a microphone, various sensors, etc. The output device can include a monitor, a speaker, an oscillator, an indicator, etc.

The communications interface 1040 is configured to be connected to a communications module (not shown in the figure), to implement a communication interaction between the device and another device. The communications module can perform communication in a wired manner (for example, USB or a network cable), or can perform communication in a wireless manner (for example, a mobile network, Wi-Fi, or Bluetooth).

The bus 1050 includes a channel, used to transmit information between components (for example, the processor 1010, the memory 1020, the input/output interface 1030, and the communications interface 1040) of the device.

It should be noted that although only the processor 1010, the memory 1020, the input/output interface 1030, the communications interface 1040, and the bus 1050 of the device are shown, during specific implementation, the device can further include other components required for implementing normal running. In addition, a person skilled in the art can understand that the device can include only components necessary for implementing the solutions in the implementations of the present application, but does not necessarily include all components shown in the figure.

An implementation of the present application further provides a computer readable storage medium. The computer readable storage medium stores a computer program, and the program can be executed by a processor to perform the above-described model training method.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be seen from the above descriptions of the implementations that, a person skilled in the art can clearly understand that the implementations of the present application can be implemented by using software and a necessary general hardware platform. Based on such an understanding, the technical solutions in the implementations of the present application essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present application or in some parts of the implementations of the present application.

The system, apparatus, module, or unit illustrated in the previously described implementations can be implemented by using a computer chip or an entity, or it can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

The implementations in the present application are described in a progressive way. For same or similar parts in the implementations, refer to the implementations. Each implementation focuses on a difference from other implementations. Particularly, an apparatus implementation is similar to a method implementation, and therefore, is described briefly. For a related part, refer to some descriptions in the method implementation. The previously described apparatus implementations are merely examples. The modules described as separate parts can or cannot be physically separate. During implementation of the solutions in the implementations of the present application, functions of the modules can be implemented in one or more pieces of software and/or hardware. Alternatively, some or all of the modules can be selected based on an actual need to achieve the objectives of the solutions in the implementations. A person of ordinary skill in the art can understand and implement the implementations of the present application without creative efforts.

The above descriptions are merely specific implementations of the implementations of the present application. It should be noted that a person of ordinary skill in the art can further make several improvements or polishing without departing from the principle of the implementations of the present application, and the improvements or polishing shall fall within the protection scope of the implementations of the present application.

Figure 9:
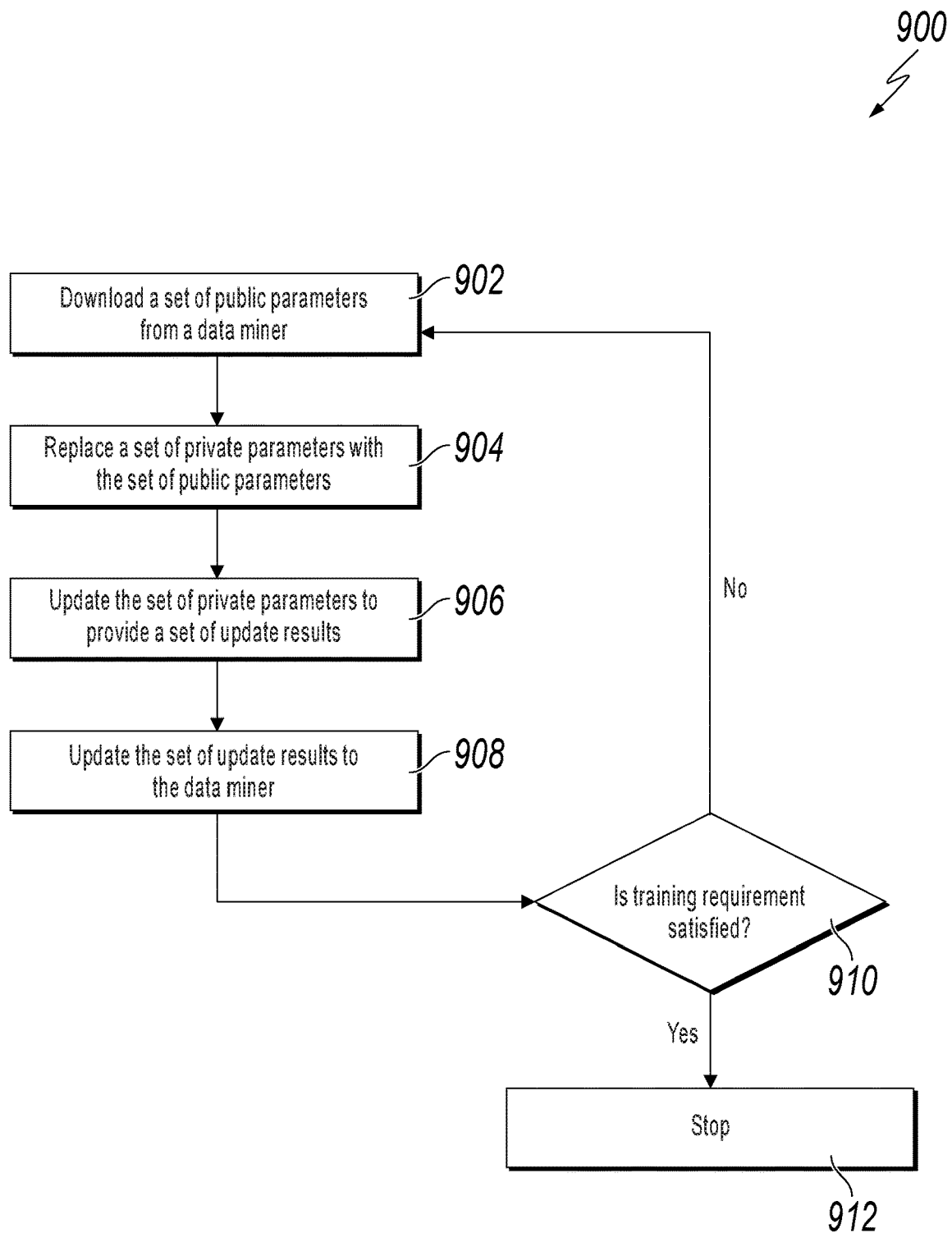
FIG. 9 is a flowchart illustrating an example of a computer-implemented method for data training, according to an implementation of the present disclosure.

FIG. 9 is a flowchart illustrating an example of a computer-implemented method 900 for data training, according to an implementation of the present disclosure. For clarity of presentation, the description that follows generally describes method 900 in the context of the other figures in this description. For example, method 900 can be performed by the model training apparatus of FIG. 6, the data providers and data miner of FIG. 7, etc. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a set of public parameters are downloaded from a data miner. The data miner can be the data miner of FIG. 7. The set of public parameters can be downloaded by at least one data provider (e.g., a data provider of FIG. 7). Each of the data miner and the data providers separately maintains multiple parameters associated with a plurality of training features. The data miner maintains a plurality of public parameters, and each of the data providers maintains a plurality of private parameters. The set of public parameters downloaded at 902 is a subset of the plurality of public parameters maintained at the data miner. In some examples, the downloaded set of public parameters includes fewer public parameters than the public parameters that the data miner maintains. Two data providers may download different sets of public parameters. For example, a first data provider may download a first set of public parameters ($w_1^1$, $w_2^1$, $w_3^1$), while a second data provider downloads a second set of public parameters ($w_3^1$, $w_4^1$). In some implementations, the data miner determines which public parameters are to be downloaded by what data providers. From 902, method 900 proceeds to 904.

At 904, a set of private parameters are replaced with the set of public parameters. Each data provider that downloaded a set of public parameters, replaces its private parameters with the respective public parameters downloaded at 902. The set of private parameters and the set of public parameters can be associated with the same training features of the plurality of training features. From 904, method 900 proceeds to 906.

At 906, the set of private parameters are updated to provide a set of update results. Each data provider updates the private parameters of its own. The private parameters can be updated based on a model parameter update algorithm and/or data associated with the respective data provider. The model parameter update algorithm can be an algorithm that provides parameter changes based on changes in the private parameters before and after being replaced by the public parameters (in the current training iteration). The set of update results can be (or can be provided based on) the parameter changes provided by the model parameter update algorithm. Examples of model parameter update algorithm includes, but is not limited to gradient descent method and stochastic gradient descent method, as described previously. The private parameters can be updated based on the data stored on the data provider. For example, the data provider may incorporate the data that is to be shared with the data miner in the model parameter update algorithm. Each update result in the set of update results can be associated to the same training feature that corresponds to a respective private parameter that is updated. From 906, method 900 proceeds to 908.

At 908, the set of update results is uploaded to the data miner. The set of update results can be uploaded based on their association with respective training features. From 908, method 900 proceeds to 910.

At 910, a determination is made as to whether a training requirement has been satisfied. If it is determined that the training requirement has been satisfied, method 900 proceeds to 912 and data training stops. If it is determined that the training requirement has not been satisfied, method 900 proceeds to 902 for a next training iteration.

The training requirement can include one or more training conditions preset on the data miner. The data miner checks the training conditions based on the set of update results uploaded to the data miner. In some examples, a training condition requires the update results to converge to a value (e.g., a predetermined value such as 0.5). In some examples, the data miner updates the public parameters based on the set of update results and a training condition requires the difference between public parameters of two consecutive iterations to be within a predetermined range (e.g., less than 5%). In some examples, a training condition requires a predetermined number of iterations (e.g., 20 iterations) to be performed.

As noted above, if it is determined that the training requirement has not been satisfied, method 900 proceeds to 902 for a next training iteration. It should be noted that one or more data providers may download public parameters associated with different training features in different iterations. For example, a first data provider may download public parameters associated with training features ($x_1$, $x_2$, $x_3$) in a first iteration, and public parameters associated with training features ($x_1$, $x_4$, $x_5$) in a second iteration different from the first iteration. In some implementations, the data miner determines which data providers download what public parameters in each iteration.

In some implementations, the update results may be further processed to enhance data sharing security. For example, each of the update results may be rounded (or truncated) to fit into a predetermined range of values, noise may be added to the update results, etc. In some implementations, the number of update results in the set of update results can be less than the number of public parameters downloaded at 902. For example, the set of update results may include only the highest parameter changes (e.g., the top 50% parameter changes). As noted earlier, parameter change indicates a change in a private parameter of the set of private parameters before and after replacing the respective private parameter with a public parameter.

In some implementations, the data provider is a first data provider, the set of update results is first set of update results, and the method 900 includes downloading, by a second data provider different than the first data provider, the set of public parameters from the data miner; replacing, by the second data provider, the set of private parameters in the second data provider with the set of public parameters; updating, by the second data provider, the set of private parameters to provide a second set of update results; and uploading, by the second data provider, the second set of update results to the data miner.

For data mining purposes (e.g., in big data) data needs to be shared (or transmitted) between data miners and data providers. A common practice is to convert the data into a common format shared between the data miner and the data providers. However, such practice does not protect the data against hackers. For example, the common format does not protect data against data hacks in data transmission processes. Such security concerns may discourage data providers (e.g., hospitals, banks, etc.) to share their data with data miners.

Implementations of the present disclosure provide data sharing techniques with improved security protections. According to the implementations, the data providers send their data to the data miner through a plurality of iterations and based on a training feature set shared between the data miner and the data providers. The data miner includes a set of public parameters associated with the training feature set. Each data provider includes a set of private parameters associated with the training feature set. In each iteration, each data provider reviews the differences between public parameters (in a subset of public parameters) and private parameters (in a subset of private parameters) associated with the same features of the training feature set and sends an update to the data miner. Since the differences between the respective parameters (rather than the whole data) are being transmitted in each iteration, a hacker would not be able to obtain the data upon hacking a data transmission. In addition, since in each data transmission iteration only a subset of parameters are being transmitted, data is secure even if a data transmission is hacked. To even further improve security in data transmission, the parameters (or the parameter differences) that are to be transmitted can be truncated, or can be modified to include noise.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for data sharing between a data miner and data providers, each of the data providers comprising one or more processors to execute the computer-implemented method, the computer-implemented method comprising:

downloading, by a first data provider, a first set of public parameters from the data miner to generate training sample data, wherein the first set of public parameters comprises parameters maintained by the data miner that are obtained after the data providers jointly participate in an update and the first set of public parameters is associated with a first feature set of training sample data, wherein the training sample data comprises a plurality of features, and the first feature set is a first subset of the plurality of features allocated by the data miner to the first data provider to be downloaded in parallel with a second subset of the plurality of features allocated by the data miner to a second data provider to satisfy a convergence condition, wherein the first subset of the plurality of features is disjoint from the second subset of the plurality of features;

replacing, by the first data provider, a set of private parameters of the first data provider with the first set of public parameters to generate a set of replaced values of the set of private parameters, wherein the set of private parameters comprises data provider parameters maintained solely by the first data provider and wherein the set of private parameters is associated with the first feature set of training sample data;

updating, by the first data provider, the set of private parameters to provide a set of update results comprising parameter change values to the set of private parameters and excluding all private parameters of the set of private parameters, the set of private parameters being updated based on a model parameter update algorithm associated with the first data provider, wherein the parameter change values comprise differences between the replaced values of the set of private parameters and the set of update results;

sorting, by the first data provider, the set of update results to generate a first sorted set of update results comprising a predetermined number of parameters of the set of update results with the parameter change values that are greater than a predetermined value provided by the data miner;

generating, by the first data provider, a first truncated set of update results by truncating the first sorted set of update results based on a predetermined value range; and uploading, by the first data provider, the first truncated set of update results to the data miner to be processed with a second truncated set of update results uploaded by the second data provider to verify the convergence condition.

2. The computer-implemented method of claim 1, wherein the set of update results are provided based on a plurality of parameter changes, each parameter change indicating a change in a private parameter of the set of private parameters before and after replacing a respective private parameter with a public parameter.

3. The computer-implemented method of claim 2, further comprising adding noise to the set of update results.

4. The computer-implemented method of claim 2, wherein the set of update results comprise one or more parameter changes with greatest parameter changes associated with the set of private parameters.

5. The computer-implemented method of claim 1, wherein a number of public parameters in the first set of public parameters is less than number of features in the training sample data.

6. The computer-implemented method of claim 1, wherein a first number of private parameters in the set of private parameters is less than a second number of features in the training sample data.

7. The computer-implemented method of claim 1, wherein the first data provider downloads a first set of public parameters using a first data parameter, and the first data provider downloads a second set of public parameters different from the first set of public parameters using a second data parameter.

8. The computer-implemented method of claim 1, wherein the computer-implemented method is repeated for a plurality of iterations until it is determined, by the one or more processors of the data miner, that a predetermined training condition is satisfied.

9. The computer-implemented method of claim 8, wherein the first data provider downloads the first set of public parameters in a first iteration of the plurality of iterations that differs from a second set of public parameters in a second iteration of the plurality of iterations.

10. A non-transitory, computer-readable medium storing one or more instructions executable by a computer system comprising one or more processors to perform operations for data sharing between a data miner and data providers, the operations comprising:

downloading a first set of public parameters from the data miner to generate training sample data, wherein the first set of public parameters comprises parameters maintained by the data miner that are obtained after the data providers jointly participate in an update and the first set of public parameters is associated with a first feature set of training sample data, wherein the training sample data comprises a plurality of features, and the first feature set is a first subset of the plurality of features allocated by the data miner to a first data provider to be downloaded in parallel with a second subset of the plurality of features allocated by the data miner to a second data provider to satisfy a convergence condition, wherein the first subset of the plurality of features is disjoint from the second subset of the plurality of features;

replacing a set of private parameters of the first data provider with the first set of public parameters to generate a set of replaced values of the set of private parameters, wherein the set of private parameters comprises data provider parameters maintained solely by the first data provider and wherein the set of private parameters is associated with the first feature set of training sample data;

updating the set of private parameters to provide a set of update results comprising parameter change values to the set of private parameters and excluding all private parameters of the set of private parameters, the set of private parameters being updated based on a model parameter update algorithm associated with the first data provider, wherein the parameter change values comprise differences between the replaced values of the set of private parameters and the set of update results;

sorting the set of update results to generate a first sorted set of update results comprising a predetermined number of parameters of the set of update results with the parameter change values that are greater than a predetermined value provided by the data miner;

generating a first truncated set of update results by truncating the first sorted set of update results based on a predetermined value range; and uploading the first sorted truncated set of update results to the data miner to be processed with a second wed truncated set of update results uploaded by the second data provider to verify the convergence condition.

11. The non-transitory, computer-readable medium of claim 10, wherein the set of update results are provided based on a plurality of parameter changes, each parameter change indicating a change in a private parameter of the set of private parameters before and after replacing a respective private parameter with a public parameter.

12. The non-transitory, computer-readable medium of claim 11, further comprising adding noise to the set of update results.

13. The non-transitory, computer-readable medium of claim 11, wherein the set of update results include one or more parameter changes with greatest parameter changes associated with the set of private parameters.

14. The non-transitory, computer-readable medium of claim 10, wherein the first data provider downloads a first set of public parameters using a first data parameter, and the first data provider downloads a second set of public parameters different from the first set of public parameters using a second data parameter.

15. The non-transitory, computer-readable medium of claim 10, wherein the operations are repeated for a plurality of iterations until it is determined, by the data miner, that a predetermined training condition is satisfied.

16. The non-transitory, computer-readable medium of claim 15, wherein the first data provider downloads the first set of public parameters in a first iteration of the plurality of iterations that differs from a second set of public parameters in a second iteration of the plurality of iterations.

17. The non-transitory, computer-readable medium of claim 10, wherein the set of update results is first set of update results, and the operations further comprise:

downloading, by a second data provider different than the first data provider, a second set of public parameters from the data miner;

replacing the set of private parameters in the second data provider with the second set of public parameters;

updating the set of private parameters to provide a second set of update results; and uploading the second set of update results to the data miner.

18. A computer-implemented system, comprising:

one or more computers comprising one or more processors; and one or more computer memory devices interoperably coupled with the one or more computers and having tangible, non-transitory, machine-readable media storing one or more instructions that, when executed by the one or more computers, perform operations for data sharing between a data miner and data providers, the operations comprising:

downloading a first set of public parameters from the data miner to generate training sample data, wherein the first set of public parameters comprises parameters maintained by the data miner that are obtained after the data providers jointly participate in an update and the first set of public parameters is associated with a first feature set of training sample data, wherein the training sample data comprises a plurality of features, and the first feature set is a first subset of the plurality of features allocated by the data miner to a first data provider to be downloaded in parallel with a second subset of the plurality of features allocated by the data miner to a second data provider to satisfy a convergence condition, wherein the first subset of the plurality of features is disjoint from the second subset of the plurality of features;

replacing a set of private parameters of the first data provider with the first set of public parameters to generate a set of replaced values of the set of private parameters, wherein the set of private parameters comprises data provider parameters maintained solely by the first data provider and wherein the set of private parameters is associated with the first feature set of training sample data;

updating the set of private parameters to provide a set of update results comprising parameter change values to the set of private parameters and excluding all private parameters of the set of private parameters, the set of private parameters being updated based on a model parameter update algorithm associated with the first data provider, wherein the parameter change values comprise differences between the replaced values of the set of private parameters and the set of update results;

sorting the set of update results to generate a first sorted set of update results comprising a predetermined number of parameters of the set of update results with the parameter change values that are greater than a predetermined value provided by the data miner;

generating a first truncated set of update results by truncating the first sorted set of update results based on a predetermined value range; and uploading the first truncated set of update results to the data miner to be processed with a second truncated set of update results uploaded by the second data provider to verify the convergence condition.

19. The computer-implemented system of claim 18, wherein the set of update results are provided based on a plurality of parameter changes, each parameter change indicating a change in a private parameter of the set of private parameters before and after replacing a respective private parameter with a public parameter.

* * * * *

UNITED STATES PATENT AND TRADEMARK OFFICE
CERTIFICATE OF CORRECTION

PATENT NO. : 11,106,802 B2  
APPLICATION NO. : 16/053606  
DATED : August 31, 2021  
INVENTOR(S) : Peilin Zhao et al.

Page 1 of 1

It is certified that error appears in the above-identified patent and that said Letters Patent is hereby corrected as shown below:

In the Claims

Column 19 / Line 38, In Claim 10, after "first" delete "sorted".

Column 19 / Line 39, In Claim 10, after "second" delete "wed".

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*